United States Patent [19]

Watanabe et al.

[11] Patent Number: 5,241,022
[45] Date of Patent: Aug. 31, 1993

[54] COATING SOLUTION FOR PREVENTING ADHESION OF POLYMER SCALE AND METHOD FOR PREVENTING SCALE ADHESION DURING PREPARATION OF POLYMERS

[75] Inventors: Mikio Watanabe, Kashima; Hajime Kitamura, Ichihara; Susumu Ueno, Kashima; Masahiro Usuki, Kashima; Masayoshi Yono, Kashima, all of Japan

[73] Assignee: Shin-Etsu Chemical Co., Ltd., Japan

[21] Appl. No.: 824,086

[22] Filed: Jan. 22, 1992

[30] Foreign Application Priority Data

Jan. 22, 1991 [JP] Japan ................. 3-005668
Feb. 22, 1991 [JP] Japan ................. 3-028941

[51] Int. Cl.⁵ .............. C08F 2/00; C08F 16/06; C08F 18/08; C08F 20/42
[52] U.S. Cl. .............. 526/62; 252/80; 252/82; 252/180; 427/230; 427/384; 427/239; 427/327; 523/464; 526/74; 526/218.1; 526/219.1; 526/219.3; 526/191; 526/201; 526/204; 526/344.2
[58] Field of Search .......... 523/464; 252/82, 180, 252/80; 526/62, 74, 218.1, 219.1, 219.3; 427/230, 384

[56] References Cited

U.S. PATENT DOCUMENTS

| | | | |
|---|---|---|---|
| 4,105,838 | 8/1978 | Kitamura et al. | 526/62 |
| 4,105,839 | 8/1978 | Koyanagi et al. | 526/62 |
| 4,152,500 | 5/1979 | Foschi et al. | 526/74 |
| 4,267,291 | 5/1981 | Jones et al. | 526/62 |
| 4,622,245 | 11/1986 | Shimizu et al. | 427/230 |
| 4,757,124 | 7/1988 | Koyanagi et al. | 526/62 |
| 4,758,639 | 7/1988 | Koyanagi et al. | 526/62 |

FOREIGN PATENT DOCUMENTS

| | | | |
|---|---|---|---|
| 1146941 | 5/1983 | Canada | 526/62 |
| 0008799 | 3/1980 | European Pat. Off. | 526/62 |
| 0091965 | 10/1983 | European Pat. Off. | 526/62 |
| 2535325 | 5/1984 | France | 526/62 |
| 61-51001 | 3/1986 | Japan | 526/62 |
| 63-156801 | 6/1988 | Japan | 526/62 |

Primary Examiner—Floyd D. Higel
Attorney, Agent, or Firm—Parkhurst, Wendel & Rossi

[57] ABSTRACT

The present invention relates to a coating solution for preventing adhesion of polymer scale and a method for preventing scale adhesion during preparation of polymers which can provide polymers having high quality without coloring thereof while preventing adhesion of polymer scale to a polymerizer when a monomer having an ethylenically unsaturated double bond is polymerized. A coating solution for preventing adhesion of polymer scale which comprises anaphthoquinone natural dyestuffs, anthraquinone natural dyestuffs, tannin natural dyestuffs, xanthone natural dyestuffs, flavonoid natural dyestuffs, or/and benzoquinone natural dyestuffs and a polyvinyl alcohol having a degree of saponification of not less than 70 mole % was applied on at least a part of a polymerizer which comes in contact with a monomer having an ethylenically unsaturated double bond and was dried to give a coating film during polymerization thereof.

12 Claims, No Drawings

COATING SOLUTION FOR PREVENTING ADHESION OF POLYMER SCALE AND METHOD FOR PREVENTING SCALE ADHESION DURING PREPARATION OF POLYMERS

BACKGROUND OF THE INVENTION

The present invention relates to a coating solution for preventing adhesion of polymer scale and a method for preventing adhesion of polymer scale to a polymerizer during polymerization of a monomer having an ethylenically unsaturated double bond, for instance, a vinyl ester or acrylic acid.

There has been known a problem that, when a polymer is prepared by polymerizing a monomer in a polymerizer, the polymer adheres to the inner wall of the polymerizer in the form of scale. The adhesion of such scale results in the reduction of cooling capacity of the polymerizer and yield of intended polymers. Moreover, if the scale peeled off during the polymerization is mixed in the product, the resulting polymer becomes nonuniform and the quality thereof is hence impaired. For this reason, it is necessary to remove scale every two or three batches. This requires a great deal of labor and time. Furthermore, the scale contains poisonous unreacted monomers and thus sufficient care would be necessary for operations.

In the polymerization of a monomer having an ethylenically unsaturated double bond, there have been known methods for preventing scale-adhesion which comprises, for instance, applying a variety of substances onto inner walls of polymerizers as scale-inhibiting agents. Examples of known substances suitable for use as scale-inhibiting agents are dyes and pigments such as those disclosed in Japanese Patent Application Publication Nos. 45-30835 and 52-24943; aromatic amine compounds such as those disclosed in Japanese Patent Provisional Publication No. 51-50887; and reaction products of phenolic compounds with aromatic aldehydes as disclosed in Japanese Patent Provisional Publication No. 55-54317. The scale-inhibiting methods which make use of these substances as scale-inhibiting agents are effective in polymerization of halogenated vinyl monomers such as vinyl chloride or mixtures comprising halogenated vinyl monomers, as principal components, and a small amount of other monomers copolymerizable therewith.

However, most of the conventional scale-inhibiting agents represented by those disclosed in the foregoing patents are colored and hence the colored scale-inhibiting agents applied onto the inner walls of polymerizers are mixed in a polymerization system through dissolution or peeling off of the colored scale. This leads to coloring of the resulting polymer product and a reduction of quality thereof.

In the foregoing scale adhesion-preventing methods, the scale adhesion-inhibitory effect of the foregoing scale-inhibiting agents varies depending on a variety of conditions such as the kinds of monomers and polymerization initiators (catalysts) used; manner of polymerization; and materials for the inner walls of polymerizers. Thus, it has been very difficult to effectively inhibit scale adhesion with certainty.

Further, if a polymerization initiator having a strong oxidative effect is used, such as potassium peroxodisulfate, ammonium peroxodisulfate, acetyl cyclohexylsulfonyl peroxide or bis(2-ethoxyethyl)peroxy dicarbonate, a scale adhesion-inhibiting agent in the form of a coating is decomposed through oxidation and this results in the reduction of the scale adhesion-inhibitory effect. Moreover, polymer scale is easily adhered to the inner walls of polymerizers made of stainless steel or other steels as compared with the inner walls of polymerizers provided with glass lining.

If monomers to be polymerized are those represented by the following general formula:

$$CH_2=CR^1R^2$$
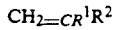

(wherein $R^1$ represents a hydrogen atom or a methyl group and $R^2$ represents a hydrogen atom or a group $-C_nH_{2n+1}$, $-COOH$, $-COOM$ in which M is an alkali metal or ammonium ion, $-COOC_nH_{2n+1}$, $-CN$, $-C_6H_5$, $-C_6H_4R^2$ in which $R^3$ represents a hydrogen atom, $-OH$, $-CH_3$ or $-CH=CH_2$; $-OCOC_nH_{2n+1}$, $-OC_nH_{2n+1}$ or $-CH=CH_2$, and n is an integer), such as styrene, α-methylstyrene, acrylates and acrylonitrile, these monomers have high abilities of solubilizing the coating film formed according to the foregoing scale adhesion-inhibiting methods. For this reason, a part or whole of the coating film is dissolved away and thus effective inhibition of scale adhesion cannot be ensured. Among these, styrene, α-methylstyrene, acrylates and acrylonitrile have extremely high capacities of solubilizing the coating films of scale adhesion-inhibiting agents and thus, any desired scale adhesion-inhibitory effect cannot be obtained. The scale adhesion is a severe problem when a polymerizer of stainless steel is used.

SUMMARY OF THE INVENTION

An object of the present invention is generally to solve the foregoing problems and more specifically to provide a coating solution for preventing adhesion of polymer scale to a polymerizer during polymerizing a monomer having an ethylenically unsaturated double bond and which can provide a polymer having high quality without causing any severe coloration.

According to the present invention, the foregoing object of the present invention can effectively be achieved by providing a coating solution which comprises a natural dyestuff and a polyvinyl alcohol having a degree of saponification of not less than 70 mole %.

Another object of the present invention is generally to solve the foregoing problems and more specifically to provide a method for preventing adhesion of polymer scale to a polymerizer during polymerizing a monomer having an ethylenically unsaturated double bond and which can provide a polymer having high quality without causing any severe coloration.

According to the present invention, the foregoing object of the present invention can effectively be achieved by providing a method for preventing scale adhesion during preparation of polymers which has a step of forming a coating film which comprises a natural dyestuff and a polyvinyl alcohol having a degree of saponification of not less than 70 mole %, on at least a part of a polymerizer which comes in contact with a monomer having an ethylenically unsaturated double bond during polymerization thereof.

The polymerizing monomer having an ethylenically unsaturated double bond is represented by the following general formula:

$$CH_2=CR^1R^2$$
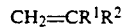

wherein $R^1$ represents a hydrogen atom or a methyl group and $R^2$ represents a hydrogen atoms or a group $-C_nH_{2n+1}$, $-COOH$, $-COOM$ in which M is an alkali metal or ammonium ion, —COOC$_n$H$_{2n+1}$, —CN, —C$_6$H$_5$, —C$_6$H$_4$R$^3$ in which R$^3$ represents a hydrogen atom, —OH, —CH$_3$ or —CH═CH$_2$; —OCOC$_n$H$_{2n+1}$, —OC$_n$H$_{2n+1}$ or —CH═CH$_2$; and n is an integer.

The natural dyestuff may be selected from the group consisting of naphthoquinone type natural dyestuffs, anthraquinone type natural dyestuffs, tannin type natural dyestuffs, xanthone type natural dyestuffs, flavonoid type natural dyestuffs and benzoquinon type natural dyestuffs. Preferred are naphthoquinone type natural dyestuffs and anthraquinone type natural dyestuffs. The best type natural dyestuff is naphthoquinone.

According to the method for preventing scale adhesion during preparation of polymers, the scale adhesion to the inner wall of a polymerizer can effectively be prevented during the polymerization of a monomer having an ethylenically unsaturated double bond irrespective of the kinds of materials for the inner walls of the polymerizers.

In the invention, a coating solution for preventing adhesion of polymer scale which is applied onto, for instance, inner walls of polymerizers in the form of coating film comprises an anthraquinone type or naphthoquinone type natural dyestuff and a polyvinyl alcohol having a degree of saponification of not less than 70 mole %. The coating film does not have an ability of coloring and further i not dissolved in a polymerization system. Thus, the present invention can provide polymers which are not colored and hence have high brightness. For this reason, the present invention can effectively be applied to polymerization systems comprising monomers having high solubilizing abilities such as styrene, α-methylstyrene, acrylates and acrylonitrile.

Moreover, when the polymerization is performed according to the method of this invention, it is sufficient to perform the operation for applying the coating solution of preventing adhesion of polymer scale every several to a dozen or so batches, in other words, it is not necessary to carry out the scale-removing operation every polymerization batches. This contributes much to the improvement of production efficiency.

DETAILED EXPLANATION OF THE INVENTION

The coating solution and the method for inhibiting scale adhesion during preparation of polymers according to the present invention will hereinafter be described in more detail.

Examples of naphthoquinone type natural dyestuffs used in the coating solution for the scale adhesion-inhibiting and the scale adhesion-inhibiting method during preparation of polymers are 1,4-naphthoquinone, 6-methyl-1,4-naphthoquinone, 2-methyl-1,4-naphthoquinone, lawson, juglone, plumbagin, lapachol, alkannin, echinochrome A, spinochrome A, vitamin K$_1$, vitamin K$_2$, naphthazarin, 2,3-dihydroxynaphthazarin, 2-methyl-naphthazarin, 2-hydroxynaphthazarin, 2-hydroxy-3-methylnaphthazarin, 2-hydroxy-3-ethylnaphthazarin, 2-hydroxy-3-acetylnaphthazarin, 2,7-dimethylnaphthazarin, alkannan, shikonin, acethylshikonin, isobutyl-shikonin, β, β'-dimethylacrylshikonin, β-hydroxyisovaleroshikonin, teracrylshikonin and derivatives thereof. These naphthoquinone type natural dyestuffs may be used alone or in any combination.

Among these naphthoquinone type natural dyestuffs, particularly preferred are, for instance, shikonin, acetylshikonin, isobutylshikonin, β, β'-dimethylacrylshikonin, β-hydroxyisovaleroshikonin, and teracrylshikonin; and naphthazarins such as naphthazarin, 2,3-dihydroxynaphthazarin, 2-methylnaphthazarin, 2-hydroxynaphthazarin, 2-hydroxy-3-methylnaphthazarin, 2-hydroxy-3-ethylnaphthazarin, 2-hydroxy-3-acethylnaphthazarin and 2,7-dimethylnaphthazarin.

These shikonins and naphthazarins can be obtained through extraction, with an organic solvent, of roots (Shikon) of Lithospermum officinale or have recently been mass-produced by the use of so-called biotechnology.

As the polyvinyl alcohol component of the coating solution for the scale adhesion-inhibiting, those having a high degree of saponification and a high average degree of polymerization are used for enhancing the ability of remaining on the wall of a polymerizer and resistance to film-forming ability of monomers.

The polyvinyl alcohol used in the invention must have a degree of saponification of not less than 70 mole %, preferably not less than 80 mole %, more preferably not less than 90 mole % and particularly not less than 98 mole %. This is because, if the degree of saponification thereof is less than 70 mole %, the resulting the coating solution for the scale adhesion -inhibiting has low ability of remaining on the wall and resistance to film-forming ability of monomers.

The polyvinyl alcohol should have an average degree of polymerization of not less than 1000, preferably not less than 1500 and in particular not less than 2000. Such polyvinyl alcohols may be used alone or in any combination of those having different degree of saponification and average degrees of polymerization.

The weight ratio of the naphthoquinone type natural dyestuff to the polyvinyl alcohol generally ranges form 100:0.1 to 100:5000 and preferably 100:1 to 100:1000.

A naphthoquinone type natural dyestuff and a polyvinyl alcohol having a degree of saponification of not less than 70 mole % are practically used by dissolving in an appropriate solvent to give a coating solution for the scale adhesion-inhibiting, applying the resulting solution onto the inner wall or the like of a polymerizer and then drying the coated film.

Typical examples of such solvents include water, alcoholic solvents such as methanol, ethanol, propanol, butanol, 2-butanol, 2-methyl-1-propanol, 2-methyl-2-pentanol; ketone type solvents such as acetone, methyl ethyl ketone and methyl isobutyl ketone; ester type solvents such as methyl formate, ethyl formate, methyl acetate and methyl acetoacetate; ether type solvents such as 4-methyldioxolan and ethylene glycol diethyl ether; and aprotic solvents such as furans, dimethylformamide, dimethylsulfoxide and acetonitrile. These solvents may be used alone or in any combination. It is desirable that the concentration of the sum of the naphthoquinone type natural dyestuff and polyvinyl alcohol in the coating solution is adjusted to the range of the order of 0.001 to 20% by weight.

Further, the coating solution for the scale adhesion-inhibiting may optionally comprise, for instance a hydrophilic polymer, a surfactant (anionic, cationic, amphoteric ones), an amine type compound, a phenolic hydroxyl group-coating compound and/or a quinone type compound for the purpose of enhancing the scale adhesion-inhibitory effect of the resulting coating film.

The pH value for the coating solution for the scale adhesion-inhibiting is preferably more than 7.0. It may optionally comprise a pH adjusting agent. Specific examples of pH adjusting agents are sulfuric acid, boric acid, phosphoric acid, acetic acid, oxalic acid, tartaric acid, lactic acid, p-toluenesulfonic acid, phytic acid, thioglycollic acid, glycollic acid, sodium hydroxide, potassium hydroxide, aqueous ammonia and ethylenediamine.

The coating solution for the scale adhesion-inhibiting thus prepared is applied onto various parts of a polymerizer which possibly comes in contact with monomers during polymerization such as the inner wall of the polymerizer, stirring blades, a stirring shaft, a condenser, a header, a search coil, a bolt and a nut and then dried to give a coating film thereon. In addition, it is likewise desirable to apply the coating solution onto various parts of unreacted monomer recovery systems to which scale may adhered such as a monomer distillation column, a condenser, a tank for storing the monomer and the inner walls of valves. Surfaces materials to be coated are not restricted to specific ones and include, for instance, stainless steel, other steels and surfaces provided with glass lining.

The coating solution for the scale adhesion-inhibiting may be applied according to any manner such as brush coating and spray coating or a method comprising filling a polymerizer with the coating solution and then withdrawing the solution. The coating can be performed according to the method as disclosed in Japanese Patent Provisional Publication No. 57-61001 which comprises automatically spray-coating through a nozzle positioned at the inner and upper portion of the polymerizer. It is also possible to apply the coating solution for the scale adhesion-inhibiting in the form of polka dots as disclosed in Japanese Patent Provisional Publication No. 59-11303. Further, an automatic coating method as disclosed in Japanese Patent Provisional Publication No. 5-36288 may likewise be used, which comprises the coating solution for the scale adhesion-inhibiting by spraying it together with water vapor as a carrier gas. The carrier gas may be vinyl chloride monomer (see Japanese Patent Provisional Publication No. 56-501116) or a low boiling point hydrocarbon gas (see Japanese Patent Provisional Publication No. 56-501117).

The drying of the coated film is performed at a temperature ranging from room temperature to 100° C. Alternatively, the drying may be performed by blowing hot air on the coated surface or previously heating the surface to be coated to a temperature ranging from 30 to 80 ° C. and then directly applying the coating solution onto the heated surface. After drying, the coating solution onto the heated surface. After drying, the coated surface is, if necessary, washed with water. The amount of the coating solution to be applied is not less than 0.001 g/m², in particular 0.05 to 2 g/m² (weighed after drying). The foregoing coating operation can be performed every polymerization batches, but it is sufficient to perform coating operation every several to dozen or so polymerization batches since the coated film once formed has substantial durability and a long-lasting scale adhesion-inhibitory effect.

The scale adhesion-inhibiting method of the present invention can be employed irrespective of the manner of polymerization. In other words, the method is effective in any of suspension polymerization, emulsion polymerization, solution polymerization, bulk polymerization and gas-phase polymerization. After forming the foregoing coating film on parts of a polymerizer which may come in contact with monomers to be polymerized such as the inner wall of the polymerizer, there are introduced, into the polymerizer, the monomer having an ethylenically unsaturated double bond represented by the general formula: $CH_2=CR^1R^2$ and optional other monomers copolymerizable therewith to perform polymerization according to the usual manner. In this respect, it is also possible to simultaneously add, to the polymerizer, other additives currently used such as an optional catalyst and a dispersant for dispersing the monomers.

More specifically, suspension and emulsion polymerization processes are generally carried out by charging water and a dispersant in a polymerizer, then introducing a polymerization initiator (catalyst) and a monomer (the internal pressure of the polymerizer usually reaches 0 to 10 kgf/cm²), optionally adding one or more of water, a dispersant and a polymerization initiator to the polymerizer during the polymerization. It is in general judged that the polymerization is completed when a desired reaction rate is attained (at the time when the reaction rate reaches 80 to 100%). In this case, the amounts of the water, dispersant and polymerization initiator range, respectively, from about 50 to 500 parts by weight, about 0.01 to 30 parts by weight and about 0.01 to 30 parts by weight and about 0.01 to 5 parts by weight per 100 parts by weight of the monomer.

In case of solution polymerization, an organic solvent such as toluene, xylene or pyridine as the polymerization medium is substituted for water. A dispersant is optionally use 2. Other conditions for the solution polymerization are the same as those for the suspension and emulsion polymerization processes.

Bulk polymerization is performed by replacing the atmosphere within a polymerizer with nitrogen gas or evacuating the interior of the polymerizer to a pressure of about 0.01 to 760 mmHg, then charging a monomer and a catalyst to perform polymerization at 10° to 250° C.

Examples of monomers to which the scale adhesion-inhibiting method of the invention can effectively be applied are vinyl esters such as vinyl acetate and vinyl propionate; acrylic acid, methacrylic acid and esters or salts thereof; diene monomers such as butadiene, chloroprene and isoprene; styrene, acrylonitrile, α-methylstyrene and vinyl ethers.

The coating solution for the scale adhesion-inhibiting of the present invention is effective even if the polymerization system comprises a variety of additives conventionally used in preparation of vinyl chloride polymers, such as polymerization initiators, dispersants, solid dispersants, emulsifying agents, fillers, stabilizers, lubricants and chain transfer agents. Specific examples of these additives are as follows.

Examples of polymerization initiators usable in the invention are t-butyl peroxy neodecanoate, bis(2-ethylhexyl) peroxy dicarbonate, 3,5,5,-trimethylbexanoyl peroxide, α-cumyl peroxy neodecanoate, cumene hydroperoxide, cyclohexanone peroxide, t-butylperoxy pivalate, bis(2-ethoxyethyl)peroxy dicarbonate, benzoyl peroxide, lauroyl peroxide, 2,4-dichlorobenzoyl peroxide, diisopropylperoxy dicarbonate, α, α'-azobisisobutyronitrile, α, α'-azobis-2,4-dimethylvaleronitrile, potassium peroxodisulfate, ammonium peroxodisulfate and p-menthane hydroperoxide.

Examples of dispersants are natural and synthetic polymers such as partially saponified polyvinyl alcohol, polyacrylic acid, copolymer of vinyl acetate and maleic anhydride, cellulose derivatives such as hydroxypropyl methyl cellulose and gelatin.

Examples of solid dispersants include calcium phosphate and hydroxy apatite.

Examples of emulsifying agents include nonionic emulsifying agents such as sorbitan monolaurate, sorbitan trioleate and polyoxyethylene alkyl ether; and anionic emulsifying agents such as sodium laurylsulfate, sodium alkylbenzenesulfonates (for instance, sodium dodecylbenzenesulfonate) and sodium dioctylsulfosuccinate.

Typical examples of fillers usable are calcium carbonate and titanium oxide.

Examples of stabilizers which may be used in the invention are tribasic lead sulfate, calcium stearate, dibutyl tin dilaurate and dioctyl tin methylcaptide.

Examples of lubricants include rice wax, stearic acid and cetyl alcohol.

Examples of plasticizers include dioctyl phthalate and dibutyl phthalate.

Examples of chain transfer agents are mercaptans such as t-dodecyl mercaptan; and trichloroethylene.

The method of the present invention is likewise effective even in polymerization systems which comprise a pH adjusting agent.

The scale adhesion-inhibiting method of the present invention can particularly effectively be applied to preparation of beads of latexes of polymers such as polystyrene, poly(methyl methacrylate) and polyacrylonitorile; preparation of synthetic rubbers, through emulsion polymerization, such as styrene-butadiene rubber (SBR), acrylonitrile-butadiene rubber (NBR), chloroprene rubber (CR), isoprene rubber (IR) and isobutylene-isoprene rubber (IIR); and preparation of acrylonitrile-butadiene-styrene (ABS) resin.

Examples of anthraquinone-type natural dyestuffs used in the coating solution for inhibiting scale adhesion during polymerization according to the present invention are tectoquinone, 3-hydroxy-2-methylanthraquinone, 2-hydroxyanthraquinone, alizarin, xanthopurpurin, rubiadin, munjistin, chrysophanic acid, carminic acid, kermesic acid and laccaic acid A as well as derivatives thereof.

In this case, there may be used the same polyvinyl alcohols as those explained above in connection with the coating solution for the scale adhesion-inhibiting comprising naphthoquinone-type natural dyestuffs. The weight ratio of the anthraquinone-type natural dyestuff to the polyvinyl alcohol ranges form 100:0.1 to 100:5000 and preferably 100:1 to 100:1000.

An anthraquinone-type natural dyestuff and a polyvinyl alcohol having a degree of saponification of not less than 70 mole % is dissolved in a proper solvent to give a coating solution for the scale adhesion-inhibiting, then applied onto, for instance, the inner wall of a polymerizer and dried. The same solvents used above may be employed. The concentration of the sum of the anthraquinone-type natural dyestuff and polyvinyl alcohol is adjusted to the range of the order of 0.001 to 20% by weight.

Compounds added to the coating solution for improving the scale adhesion-inhibitory effect and pH of the coating solution are the same as those explained above in connection with the coating solution comprising naphthoquinone-type natural dyestuffs.

Parts of the polymerizer to which the coating solution is applied, materials for the surface to be coated, methods for applying the coating solution and methods for drying the coated film are likewise identical to those discussed above in connection with the coating solution comprising naphthoquinone-type natural dyestuffs. Furthermore, manner of polymerization to which the method for preventing scale adhesion is applied, monomers to which the method can effectively be applied, a variety of additives use din preparation of polymers and polymerization reactions to which the method can be particularly preferably applied are identical to those discussed above in connection with the coating solution comprising naphthoquinone type natural dyestuffs.

Examples of natural dyestuffs which may be used in the coating solution and the method for preventing scale adhesion during polymerization according to the present invention further include tannin type natural dyestuffs, xanthone type natural dyestuffs, flavonoid type natural dyestuffs and benzoquinone type natural dyestuffs in addition to the foregoing naphthoquinone type and anthraquinone type ones.

Examples of tanning type natural dyestuffs are chlorogenic acids such as chlorogenic acid, isochlorogenic acid and theogallin as well as derivatives thereof; catechins such as catechin and gallocatechin as well as derivatives thereof; and leucoanthocyanins such as phlobaphene and derivatives thereof.

Examples of xanthone type natural dyestuffs are gentisin, isogentisin, swertiamarin, euxanthone, jacareubin, mangostin, mangiferin, lichexanthone, asperxanthone and ravenerin as well as derivatives thereof.

Examples of flavonoid type natural dyestuffs include flavones such as apigenin, primetin, baicalein, wogonin, scutellarin, luteolin, diosmetin and tricin as well as derivative thereof; flavonols such as galangin, datiscetin, kaempferol, fisetin, morin, quercetin, robinetin, calycopterin, gossypetin and syricetin as well as derivaties thereof; anthocyanins such as callistephin, pelargonin, fragarin, raphanin, salvianin, chrysanthemin, cyanin, keracyanin, shisonin, idaein, mecocyanin, rubrobrassicin, cyanidine-3-arabinoside, oxycoccicyanin, peonin, delphinin, delphin, nasumin, ciolanin, hyacin, awobanin, petunin, petunidin-5-xyloside, oenin, malvin, ensatin and uliginosin as well as derivatives thereof; flavonoid C-glycosides such as orientin and derivatives thereof; biflavonyls such as ginkgetin and derivatives thereof; chalcones such as carthamn, isocarthamin, pedicinin and butein as well as derivatives thereof; and aurones such as aureusidin, leptosidin and as well as derivatives thereof. Among the foregoing flavonoid natural dyestuffs, particularly preferred are flavones such as apigenin, primetin, baicalein and wogonin; flavonols such as galangin, datiscetin, kaempferol, fisetin, morin, quercetin, robinetin and myricetin; flavonoid C-glycosides such as orientin; and chalcones such as carthamin, isocarthamin, pedicinin and butein.

Examples of benzoquinone type natural dyestuffs include o-benzoquinone, p-benzoquinone, tolu-p-quinone, o-xylo-p-quinone, thymoquinone, 2-methoxybenzoquinone, gentisyl quinone, polyporic acid and ubiquinone n as well as derivatives thereof.

When a monomer having an ethylenically unsaturated double bond is polymerized in a polymerizer, a coating film comprising a natural dyestuff and a polyvinyl alcohol having a degree of saponification of not less than 70 mole % is previously applied onto parts of the polymerizer which possibly come in contact with the monomer. The resulting film serves to inhibit any physical and/or chemical adsorption of the monomer having an ethylenically unsaturated double bond, the initial condensates thereof and the resulting polymers present in the polymerizer onto the inner wall of the polymerizer and thus any formation of scale can be prevented.

The present invention will hereinafter be explained in more detail with reference to the following non-limitative working Examples.

Examples which make use of the coating solution for the scale adhesion-inhibiting comprising naphthoquinone type natural dyestuffs are as follows.

Preparation of Coating solution for Preventing Adhesion of Polymer Scale

Coating solutions each having a composition as listed in the following Tables 1 to 3 were prepared by dissolving naphthoquinone type natural dyestuffs and polyvinyl alcohols in solvents and then adding pH adjusting agents. The kinds of naphthoquinone type natural dyestuffs, polyvinyl alcohols, weight ratios of the dyestuffs to the polyvinyl alcohols, solvents (compositions thereof), total concentration, pH adjusting agents and pH values of the resulting coating solutions employed in Examples and Comparative Examples are detailed in the following Tables 1 to 3. Polyvinyl alcohols used are those commercially available and listed in Table 4. In Comparative Example 5, C.I. Acid Black 2, an azine type synthetic dye, was substituted for the naphthoquinone type natural dyestuff.

Polymerization

Each resulting coating solution was applied to parts (such as a inner wall, a shaft for stirring, stirring blades or the like) of a polymerizer of stainless steel, having an inner volume of 1000l and provided with a stirring machine, which might come in contact with monomers used, using a spray coater, the temperature of a jacket was adjusted to 50° C., followed by drying through heating for 10 minutes and washing with water to give a coating film.

There were charged, to the polymerizer which had thus been subjected to scale adhesion-inhibiting treatment, 550 kg of water, 125 kg of styrene, 120 kg of styrene-butadiene rubber latex (solid content=50%), 50 kg of acrylonitrile, 2.5 kg of an emulsifying agent for polymerizing synthetic rubbers (BANDIS T-100P, available from Harima Chemicals, Inc.), 0.1 kg of sodium hydroxide, 1.5 kg of t-dodecyl mercaptan and 0.3 kg of potassium peroxodisulfate and polymerization was performed at 70° C. for 3 hours with a stirring.

Determination of Amount of Scale Adhered

After the polymerization, the amount of the scale formed was determined by scraping off the polymer scale from the wall and it was expressed in terms of the weight of scale adhered per 1 $m^2$ of the wall area.

Determination of Brightness Index (L value)

The brightness index of each polymer obtained in Examples and Comparative Examples was determined to evaluate whether the polymers were colored or not. The brightness index was determined in the following manner.

An amount of a 2% magnesium sulfate solution was added to each resulting polymer latex (1kg) to coagulate and precipitate the polymer and the polymer precipitated was filtered off. The precipitates filtered off were washed with hot water of 80° to 90° C. two or three times, then dried at 40° C. for 25 hours in a vacuum dryer to give a resin.

The resulting resin was introduced into a frame of 9×9 cm (thickness 0.1 cm) and press-molded under heating at 195° C., 50 to 60 kgf/$cm^2$ to give a sample for testing. The brightness index L of the sample was determined according to Hunter's color difference equation as disclosed in JIS Z 8730 (1980). The greater the L value, the higher the brightness of the polymer.

The L value was determined as follows.

According to the description of JIS Z 8722, the stimulus value Y of the XYZ color system was determined by a stimulus value direct-reading method using the standard illuminant C and a photoelectric color meter (Z-1001DP Model, a colorimetric color difference meter; available from Nippon Denshoku Kogyo Co., Ltd.). The conditions described in the item 4.3.1 of JIS Z 8722 were adopted as geometrical conditions for illumination and light reception. The value L can be obtained by substituting the resulting stimulus value Y into the equation: $L=10Y^{\frac{1}{2}}$.

The amount of scale adhered and brightness indexes (L values) thus obtained are summarized in Tables 1 to 3. In these Tables, A represents a naphthoquinone type natural dyestuff and B represents a polyvinyl alcohol.

TABLE 1

| Ex. Nos. | Naphthoquinone Natural Dyestuff (Component A) | Polyvinyl Alcohol (Component B) | Weight Ratio (A/B) | Solvent Water/$CH_3OH$ | Total Concn. (A + B) (%) | pH Adjust Agent | pH | Amount of Scale Adhered (g/$m^2$) | Brightness Index |
|---|---|---|---|---|---|---|---|---|---|
| 1 | Shikonin | Kuraray PVA-140 | 100/100 | 50/50 | 0.3 | KOH | 7.0 | 1 | 84.5 |
| 2 | Shikonin | Kuraray PVA-140 | 100/10 | 50/50 | 0.3 | KOH | 9.0 | 2 | 84.0 |
| 3 | Shikonin | Kuraray PVA-140 | 100/600 | 50/50 | 0.3 | KOH | 9.0 | 0 | 84.7 |
| 4 | Shikonin | Kuraray PVA-140 | 100/100 | 50/50 | 0.1 | KOH | 9.0 | 1 | 84.9 |
| 5 | Shikonin | Kuraray PVA-140 | 100/200 | 50/50 | 0.3 | Sulfuric Acid | 4.5 | 4 | 84.6 |
| 6 | Naphthazarin | Shin-Etsu C-25 | 100/200 | 50/50 | 0.3 | Boric Acid | 4.0 | 7 | 84.7 |
| 7 | Shikonin | Shin-Etsu C-25 | 100/200 | 50/50 | 0.3 | Phosphoric Acid | 4.0 | 4 | 84.5 |
| 8 | Shikonin | Shin-Etsu C-25 | 100/100 | 80/20 | 0.3 | KOH | 8.5 | 1 | 84.5 |
| 9 | 2,7-Dimethyl-naphthazarin | Shin-Etsu C-17 | 100/100 | 80/20 | 0.3 | KOH | 8.5 | 1 | 84.4 |
| 10 | Acetylshikonin | Shin-Etsu PA-18 | 100/150 | 80/20 | 0.3 | KOH | 8.5 | 1 | 83.7 |

TABLE 2

| Ex. Nos. | Naphthoquinone Natural Dyestuff (Component A) | Polyvinyl Alcohol (Component B) | Weight Ratio (A/B) | Solvent Water/ $CH_3OH$ | Total Concn. (A + B) (%) | pH Adjust Agent | pH | Amount of Scale Adhered ($g/m^2$) | Brightness Index |
|---|---|---|---|---|---|---|---|---|---|
| 11 | 2,3-dihydroxy-naphthazarin | Gohsenol KP-08 | 100/150 | 80/20 | 0.3 | KOH | 8.5 | 6 | 84.5 |
| 12 | 2-hydroxy-naphthazarin | Gohsenol NH-26 | 100/150 | 80/20 | 0.5 | NaOH | 8.5 | 1 | 84.5 |
| 13 | β,β'-dimethyl-acrylshikonin | Gohsenol NH-26 | 100/150 | 80/20 | 0.5 | NaOH | 8.5 | 1 | 83.7 |
| 14 | Isobutylshikonin | Gohsenol NH-26 | 100/150 | 80/20 | 0.5 | NaOH | 8.5 | 0 | 83.4 |
| 15 | Naphthazarin | Shin-Etsu C-20 | 100/150 | 80/20 | 0.5 | NaOH | 8.5 | 1 | 84.6 |
| 16 | Juglone | Shin-Etsu C-20 | 100/150 | 80/20 | 0.5 | NaOH | 8.5 | 1 | 84.5 |
| 17 | Lawson | Shin-Etsu C-20 | 100/150 | 80/20 | 0.5 | KOH | 8.5 | 2 | 84.6 |

TABLE 3

| Comp. Ex. Nos. | Naphthoquinone Natural Dyestuff (Component A) | Polyvinyl Alcohol (Component B) | Weight Ratio (A/B) | Solvent Water/ $CH_3OH$ | Total Concn. (A + B) (%) | pH Adjust Agent | pH | Amount of Scale Adhered ($g/m^2$) | Brightness Index |
|---|---|---|---|---|---|---|---|---|---|
| 1 | None | None | — | — | — | — | — | 550 | 85.2 |
| 2 | Shikonin | None | 100/0 | 50/50 | 0.5 | KOH | 9.0 | 110 | 82.5 |
| 3 | None | Kuraray PVA-140 | 0/100 | 50/50 | 0.5 | KOH | 9.0 | 530 | 85.0 |
| 4 | Shikonin | Gohsenol L-5407 | 100/100 | 50/50 | 0.5 | KOH | 9.0 | 25 | 84.5 |
| 5 | C.I. Acid Black 2 | Kuraray PVA-140 | 100/100 | 50/50 | 0.5 | Sulfuric Acid | 2.5 | 5 | 77.2 |

TABLE 4

| Polyvinyl Alcohol | Degree of Saponification (mole %) | Average Degree of Polymerization P |
|---|---|---|
| Kuraray PVA-140 (Available from Kuraray Co., Ltd.) | 99.0 ± 0.5 | 4000 |
| Gohsenol NH-26 (Available from The Nippon Synthetic Chemical Industry, Co., Ltd.) | 99.0 or more | 2600 |
| Shin-Etsu Poval C-20 (Available from Shin-Etsu Chemical Co., Ltd.) | 99.0 or more | 2000 |
| Shin-Etsu Poval C-25 (Available from Shin-Etsu Chemical Co., Ltd.) | 99.0 or more | 2500 |
| Shin-Etsu Poval C-17 (Available from Shin-Etsu Chemical Co., Ltd.) | 98.5 ± 0.5 | 1700 |
| Shin-Etsu Poval PA-18 (Available from Shin-Etsu Chemical Co., Ltd.) | 88 ± 1 | 1800 |
| Gohsenol KP-08 (Available from The Nippon Synthetic Chemical Industry, Co., Ltd.) | 73 ± 2 | 800 |
| Gohsenol C-5407 (Available from The Nippon Synthetic Chemical Industry, Co., Ltd.) | 40 ± 1 | 390 |

Examples which make use of the coating solution for the scale adhesion-inhibiting comprising anthraquinone type natural dyestuffs are as follows.

Preparation of Coating Solution for Preventing Adhesion of Polymer Scale

Coating solutions each having a composition as listed in the following Tables 5 and 8 were prepared by dissolving anthraquinone type natural dyestuffs and polyvinyl alcohols in solvents and then adding pH adjusting agents. The kinds of anthraquinone type natural dyestuffs, polyvinyl alcohols, weight ratios of the dyestuffs to the polyvinyl alcohols, solvents (compositions thereof), total concentrations, pH adjusting agents and pH values of the resulting coating solutions employed in these Examples and Comparative Examples are detailed in the following Tables 5 to 8. Polyvinyl alcohols used are those commercially available and listed in the foregoing Table 4. In Comparative Example 10, C.I. Acid Black 2, an azine type synthetic dye, was substituted for the anthraquinone type natural dyestuff.

Polymerization, determination of the amount of scale adhered and determination of the brightness index (L value) were performed in the same manner used in the foregoing Examples in which naphthoquinone type natural dyestuffs were used. The amount of scale adhered and the brightness indexes (L values) thus obtained are summarized in Table 5 to 7. In these Tables, A represents a anthraquinone type natural dyestuff and B represents a polyvinyl alcohol.

TABLE 5

| Ex. Nos. | Anthraquinone Natural Dyestuff (Component A) | Polyvinyl Alcohol (Component B) | Weight Ratio (A/B) | Solvent | Total Concn. (A + B) (%) | pH Adjust Agent | pH | Amount of Scale Adhered ($g/m^2$) | Brightness Index |
|---|---|---|---|---|---|---|---|---|---|
| 18 | Carminic Acid | Shin-Etsu C-25 | 100/100 | Water/$CH_3OH$ 50/50 | 1.0 | KOH | 9.0 | 1 | 83.7 |
| 19 | Carminic Acid | Shin-Etsu C-25 | 100/10 | Water/$CH_3OH$ 50/50 | 0.3 | KOH | 9.0 | 1 | 84.2 |
| 20 | Carminic Acid | Shin-Etsu C-25 | 100/100 | Water/$CH_3OH$ 50/50 | 0.1 | KOH | 9.0 | 1 | 84.4 |
| 21 | Carminic Acid | Shin-Etsu C-25 | 100/100 | Water/$CH_3OH$ | 0.01 | KOH | 9.0 | 4 | 84.9 |

TABLE 5-continued

| Ex. Nos. | Anthraquinone Natural Dyestuff (Component A) | Polyvinyl Alcohol (Component B) | Weight Ratio (A/B) | Solvent | Total Concn. (A + B) (%) | pH Adjust Agent | pH | Amount of Scale Adhered (g/m²) | Brightness Index |
|---|---|---|---|---|---|---|---|---|---|
| 22 | Carminic Acid | Shin-Etsu C-25 | 100/800 | 50/50 Water/CH₃OH 50/50 | 0.5 | KOH | 9.0 | 1 | 84.3 |
| 23 | Alizarin | Kuraray PVA-140 | 100/100 | Water/CH₃CH₂OH 50/50 | 0.5 | Ethylene-diamine | 9.5 | 1 | 84.2 |
| 24 | 2-hydroxy-anthraquinone | Kuraray PVA-140 | 100/100 | Water/CH₃CH₂OH 50/50 | 0.5 | Ethylene-diamine | 9.5 | 2 | 84.1 |

TABLE 6

| Ex. Nos. | Anthraquinone Natural Dyestuff (Component A) | Polyvinyl Alcohol (Component B) | Weight Ratio (A/B) | Solvent | Total Concn. (A + B) (%) | pH Adjust Agent | pH | Amount of Scale Adhered (g/m²) | Brightness Index |
|---|---|---|---|---|---|---|---|---|---|
| 25 | Laccaic Acid A | Kuraray PVA-140 | 100/250 | Water/CH₃CH₂OH 50/50 | 0.5 | Ethylene-diamine | 9.0 | 1 | 84.2 |
| 26 | Munjistin | Gohsenol NH-26 | 100/250 | Water/CH₃CH₂OH 50/50 | 0.5 | Ethylene-diamine | 9.0 | 2 | 84.1 |
| 27 | Tectoquinone | Shin-Etsu C-20 | 100/250 | Water/CH₃CH₂OH 50/50 | 0.3 | Ethylene-diamine | 9.0 | 2 | 84.3 |
| 28 | Chrysophanic Acid | Shin-Etsu C-17 | 100/250 | Water/CH₃CH₂OH 50/50 | 0.3 | Ethylene-diamine | 9.0 | 6 | 84.2 |
| 29 | 3-hydroxy-2-methyl-anthraquinone | Shin-Etsu PA-18 | 100/250 | Water/CH₃CH₂OH 50/50 | 0.3 | Ethylene-diamine | 9.0 | 7 | 84.2 |
| 30 | Alizarin | Gohsenol KP-08 | 100/250 | Water/CH₃CH₂OH 50/50 | 0.3 | Ethylene-diamine | 9.0 | 6 | 84.3 |
| 31 | Rubiadin | Gohsenol NH-26 | 100/400 | Water/CH₃OH 90/10 | 0.3 | Aqueous Ammonia | 10.0 | 1 | 84.2 |
| 32 | Xanthopurpurin | Gohsenol NH-26 | 100/400 | Water/CH₃OH 90/10 | 0.3 | Aqueous Ammonia | 10.0 | 2 | 84.1 |
| 33 | Kermesic Acid | Gohsenol NH-26 | 100/400 | Water/CH₃OH 90/10 | 0.3 | Aqueous Ammonia | 10.0 | 1 | 84.1 |
| 34 | Chrysophanic Acid | Shin-Etsu C-20 | 100/400 | Water/CH₃OH 90/10 | 0.3 | Sulfuric Acid | 3.0 | 5 | 84.4 |
| 35 | 2-Hydroxy-anthraquinone | Shin-Etsu C-20 | 100/400 | Water/CH₃OH 90/10 | 0.3 | Phosphoric Acid | 4.0 | 7 | 84.3 |

These test results indicate that the vinyl chloride polymer obtained in each Example has a brightness index of not less than 80, i.e., high brightness and is not colored at all.

Furthermore, coating solution each having a composition as listed in the following Table 9 were prepared by dissolving naphthoquinone type natural dyestuffs or anthraquinone type natural dyestuffs, and polyvinyl alcohols in solvents and then adding pH adjusting agents. Then, polymerizations were performed in the same manner used in the foregoing Examples.

After the polymerization, the amount of the scale formed was determined by scraping off the polymer scale from the wall and it was expressed in terms of the weight of scale adhered per 1 m² of the wall area.

The foregoing polymerization was performed repeatedly till the amount of scale adhered was over 10 g/m². Preventing scale times was determined as the time of polymerization of which amount of scale adhered was over 10 g/m².

Preventing scale times thus obtained are summarized in Table 8.

TABLE 7

| Comp. Ex. Nos. | Anthraquinone Natural Dyestuff (Component A) | Polyvinyl Alcohol (Component B) | Weight Ratio (A/B) | Solvent | Total Concn. (A + B) (%) | pH Adjust Agent | pH | Amount of Scale Adhered (g/m²) | Brightness Index |
|---|---|---|---|---|---|---|---|---|---|
| 6 | None | None | — | — | — | — | — | 550 | 85.2 |
| 7 | Carminic Acid | None | 100/0 | Water/CH₃OH 50/50 | 0.3 | KOH | 9.0 | 130 | 82.2 |
| 8 | None | Shin-Etsu C-25 | 0/100 | Water/CH₃OH 50/50 | 0.3 | KOH | 9.0 | 530 | 85.0 |
| 9 | Carminic Acid | Gohsenol L-5407 | 100/100 | Water/CH₃OH 50/50 | 0.3 | KOH | 9.0 | 24 | 84.2 |
| 10 | C.I. Acid Black 2 | Shin-Etsu C-25 | 100/100 | Water/CH₃OH 50/50 | 0.3 | Phosphoric Acid | 2.0 | 6 | 78.5 |

TABLE 8

| Ex. Nos. | Natural Dyestuff (Component A) | Polyvinyl Alcohol (Component B) | Weight Ratio (A/B) | Solvent | Total Concn. (A + B) (%) | pH Adjust Agent | pH | Preventing Scale Times (batch) |
|---|---|---|---|---|---|---|---|---|
| 36 | Carminic Acid | Kuraray PVA-140 | 100/200 | Water/CH$_3$OH 80/20 | 0.3 | NaOH | 8.5 | 28 |
| 37 | Chrysophanic Acid | Gohsenol NH-26 | 100/200 | Water/acetone 90/10 | 1.3 | KOH | 8.0 | 26 |
| 38 | Acetylshikonin | Gohsenol NH-26 | 100/200 | Water/CH$_3$OH 50/50 | 0.3 | KOH | 8.5 | 39 |
| 39 | Shikonin | Kuraray PVA-140 | 100/200 | Water/CH$_3$OH 80/20 | 0.3 | NaOH | 9.5 | 41 |

What is claimed is:

1. A coating solution for preventing adhesion of polymer scale to a polymerizer during aqueous polymerization of a monomer having an ethylenically unsaturated double bond and represented by the formula $CH_2=CR^1R^2$ wherein $R^1$ is a hydrogen atom or a methyl group, $R^2$ is any of a hydrogen atom, $-C_nH_{2n+1}$, $-COOH$, $-COOM$ in which M is an alkali metal or ammonium ion; $-COOC_nH_{2n+1}$, $-CN$, $-C_6H_5$, $-C_6H_4R^3$ in which $R^3$ represents a hydrogen atom, $-OH$, $-CH_3$, $-CH=CH_2$, $-OCOC_nH_{2n+1}$, $-OC_nH_{2n+1}$, or $-CH=CH_2$, and n is an integer, said solution comprising (1) a polyvinyl alcohol having a degree of saponification of not less than 70 mole % and (2) a quinone selected from the group consisting of 1,4-naphthoquinone, 6-methyl-1,4-naphthoquinone, 2-methyl-1,4-naphthoquinone, lawson, juglone, plumbagin, lapachol, alkannin, echinochrome A, spinochronme A, vitamin K$_1$, vitamin K$_2$, naphthazarin, 2,3-dihydroxynaphthazarin, 2-methylnaphthazarin, 2-hydroxy-naphthazarin, 2-hydroxy-3-methylnaphthazarin, 2-hydroxy-3-ethylnaphthazarin, 2-hydroxy-3-acetylnaphthazarin, 2,7-dimethylnaphthazarin, alkannan, shikonin, acetylshikonin, isobutylshikonin, β, β'-dimethylacrylshikonin, β-hydroxyisovaleroshikonin, teracrylshikonin, tectoquinone, 3-hydroxy-2-methylanthraquinone, 2-hydroxyanthraquinone, alizarin, xanthopurpurin, rubiadin, munjistin, chrysophanic acid, carminic acid, kermesic acid, and laccaic acid A.

2. The coating solution of claim 1 wherein the weight ratio of the quinone to the polyvinyl alcohol ranges form 100:0.1 to 100:5,000.

3. The coating solution of claim 1 wherein the concentration of the sum of the quinones and the polyvinyl alcohol in the coating solution ranges from about 0.001 to about 20% by weight.

4. The coating solution of claim 1 wherein the pH value of the solution is not less than 7.0.

5. The coating solution of claim 1 wherein the naphthoquinones and naphthoquinone derivatives are at least one member selected from the group consisting of shikonin, naphthazarin, 2,7-methylnaphthazarin, acetylshikonin, 2,3-dihydroxynaphthazarin, 2-hydroxy-naphthazarin, β, β-dimethylacrylshikonin, isobutylshikonin, juglone, and lawson.

6. A method for preventing scale adhesion during aqueous formation of polymers comprising placing a coating film formed of (1) a polyvinyl alcohol having a degree of saponification of not less than 70 mole % and (2) a quinone selected from the group consisting of 1,4-naphthoquinone, 6-methyl-1,4-naphthoquinone, 2-methyl-1,4-naphthoquinone, lawson, juglone, plumbagin, lapachol, alkannin, echinochrome A, spinochrome A, vitamin K$_1$, vitamin K$_2$, naphthazarin, 2,3-dihydroxynaphthazarin, 2-methylnaphthazarin, 2-hydroxy-naphthazarin, 2-hydroxy-3-methylnaphthazarin, 2-hydroxy-3-ethylnaphthazarin, 2-hydroxy-3-acetylnaphthazarin, 2,7-dimethylnaphthazarin, alkannan, shikonin, acetylshikonin, isobutylshikonin, β, β'-dimethylacrylshikonin, β-hydroxy-isovaleroshikonin, teracrylshikonin, tectoquinone, 3-hydroxy-2-methylanthraquinone, 2-hydroxyanthraquinone, alizarin, xanthopurpurin, rubiadin, munjistin, chrysophanic acid, carminic acid, kermesic acid, and laccaic acid A on at least a part of a polymerizer that comes in contact with a monomer having an ethylenically unsaturated double bond during polymerization thereof, the monomer being represented by the formula:

$$CH_2=CR^1R^2$$

wherein $R^1$ is a hydrogen atom or a methyl group, $R^2$ is any of a hydrogen atom, $-C_nH_{2n+1}$, $-COOH$, $-COOM$ in which M is an alkali metal or ammonium ion; $-COOC_nH_{2n+1}$, $-CN$, $-C_6H_5$, $-C_6H_4R^3$ in which $R^3$ represents a hydrogen atom, OH, $-CH_3$, $-CH=CH_2$, $-OCOC_nH_{2n+1}$, $-OC_nH_{2n+1}$, or $-CH=CH_2$, and n is an integer.

7. The method of claim 6 wherein the coating film comprising the quinones and the polyvinyl alcohol is applied in a quantity from 0.001 to 2 g/m$^2$.

8. The method of claim 6 wherein the monomer having an ethylenically unsaturated double bond is at least one member selected from the group consisting of a vinyl ester, acrylic acid, methacrylic acid and esters or salts thereof; a diene monomer, styrene, acrylonitrile, α-methyl styrene, and a vinyl ether.

9. The method of claim 8 wherein the vinyl ester is vinyl acetate or vinyl propionate.

10. The method of claim 8 wherein the diene monomer is butadiene, chloroprene, or isoprene.

11. The method of claim 6 wherein the polymer produced is a member selected from the group consisting of beads or latexes of polystyrene, polymethyl methacrylate, and polyacrylonitrile; a synthetic rubber; and acrylonitrile-butadiene-styrene resin.

12. The method of claim 11 wherein the synthetic rubber is any of styrene-butadiene rubber, acrylonitrile-butadiene rubber, chloroprene rubber, isoprene rubber, or isobutylene-isoprene rubber.

* * * * *